No. 874,117. PATENTED DEC. 17, 1907.
W. W. PORTMANN.
LAMP HEATING STOVE.
APPLICATION FILED MAY 20, 1907.
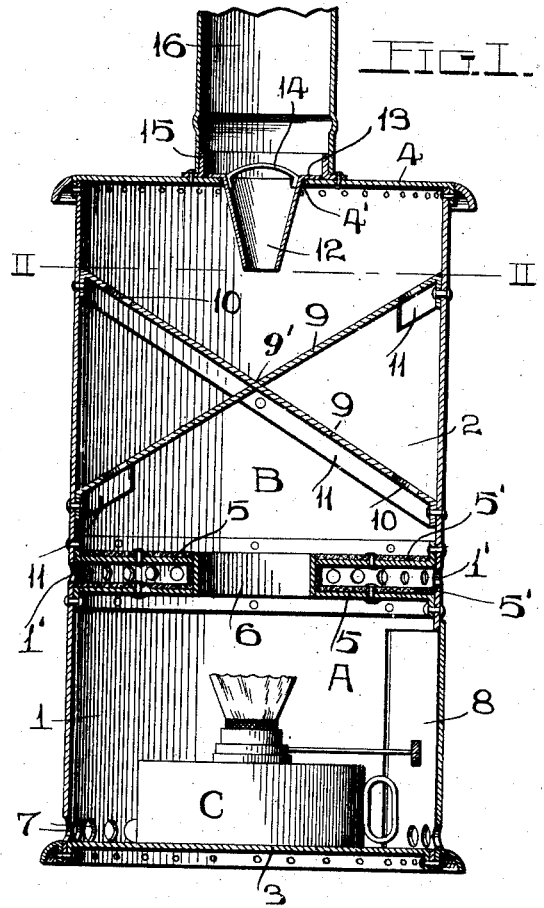
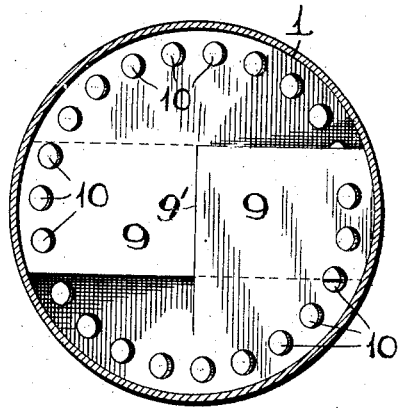
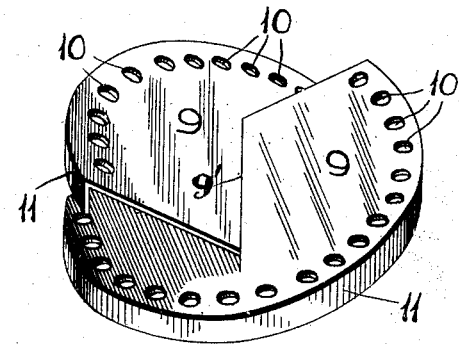
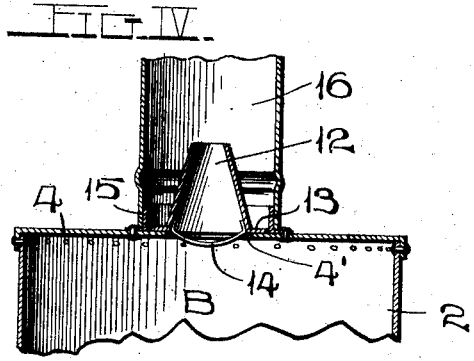
ATTEST
H. J. Fletcher
Lily Rost
INVENTOR.
WM. W. PORTMANN.
BY Geo. N. Knight ATT'Y.

UNITED STATES PATENT OFFICE.

WILLIAM W. PORTMANN, OF ST. LOUIS, MISSOURI.

LAMP HEATING-STOVE.

No. 874,117.

Specification of Letters Patent.

Patented Dec. 17, 1907.

Application filed May 20, 1907. Serial No. 374,569.

*To all whom it may concern:*

Be it known that I, WILLIAM W. PORTMANN, a citizen of the United States of America, residing in the city of St. Louis and State of Missouri, have invented certain new and useful Improvements in Lamp Heating-Stoves, of which the following is a full, clear, and exact description, reference being had to the accompanying drawing, forming part of this specification.

My invention relates to a heating stove particularly designed to have used therein as a heating medium a lamp or similar device such as an oil lamp within which are hot air retarding members which cause the air to be confined in the stove after it has been heated until the heat has been radiated from the stove into the room in which the stove is used.

The improvement also contemplates the use of an air conducting flue applied to the stove and through which the odors and fumes, due to the combustion of the fuel in the stove, may be conducted to the exterior of the room in which the stove is used.

Figure I is a vertical section taken through my stove. Fig. II is a horizontal section taken on line II—II, Fig. I and showing a plan view of the crossed segment shaped baffle plates or hot air retarding members. Fig. III is a perspective view of the crossed segment shaped baffle plates or hot air retarding members. Fig. IV is a vertical section taken through the upper part of the stove drum and showing the funnel shaped baffle member utilized therein inverted from the position in which it is seen in Fig. I.

In the accompanying drawings: 1 designates the shell of my stove which includes a drum 2. The shell is provided with a bottom 3, a top 4 and is sub-divided by a horizontal partition 5 containing a central orifice 6. The partition just referred to divides the interior of the shell into a lower lamp compartment A and an upper drum chamber B. In the shell 1 at a point immediately above its bottom 3 are air inlet openings 7 through which the necessary quantity of air for the supply of a lamp C may enter the lamp chamber. Access into the said lamp chamber is gained through a door-way that is closed by a door 8. During the use of the stove the air that enters into the lamp chamber is heated while the lamp therein is in service and the heated air rises through the orifice in the partition 5 and into the drum chamber B.

9 designates a pair of crossed segment shaped baffle plates that are obliquely or diagonally arranged within the drum chamber B and are provided near their edges with air holes 10. These baffle plates are fitted into each other, for which purpose one of the baffle plates has a transverse slit 9' to receive the other, as seen in Figs. II and III, and each baffle plate is provided at its outer edge with a segmental flange 11 through which rivets or other means of fastening may be passed and introduced through the drum portion of the shell of the stove for the purpose of securing the baffle plates to the shell. The baffle plates being constructed as described and being arranged obliquely within the drum chamber, serve as means for retarding the upward movement of the hot air that enters the lower end of the drum chamber B in order that such air may not escape rapidly from the drum chamber but will be confined therein in order that the drum of the stove shell may become highly heated and the heat be radiated therefrom. It will be seen, however, that there is provision for a slow upward movement of the heated air, due to the existence of the air holes in the baffle plates and the fact that the upper portion of each plate being spaced apart from the lower portion of the other plate so that the air will be caused to travel in a circuitous course in its passage to a point above the plates.

In the top 4 of the stove shell is a central air outlet opening 4'. 12 is a funnel shaped baffle member that is provided at its larger end with a supporting rim 13 and is adapted to be used at the air outlet opening in the top of the stove shell in either the depending position illustrated in Fig. I, whereby it hangs suspended into the stove drum or in the upwardly extending position illustrated in Fig. IV so that it extends upwardly from the top of the stove shell. In either of these instances the rim of the member 12 serves as a support for it by resting upon the top 4. The baffle member 12 is provided with a handle 14 by which it may be readily lifted for the purpose of removing it from the air outlet opening in the top of the stove shell when it is hanging in a suspended position therein and when said member is removed from the air outlet opening access may be readily gained to the drum chamber B for the purpose of removing accumulation of soot from the parts of the stove in said chamber.

15 designates a collar mounted upon and attached to the top of the stove shell and which is adapted to receive a flue or stove pipe 16 slidingly fitted thereto into which the air and fumes escaping from the drum chamber B pass and by which they may be conducted to the exterior of the room in which the stove is used, thereby relieving the user of the stove of all obnoxious fumes and odors that would, in the absence of the flue, escape from the stove into the room in which it is utilized.

For the purpose of preventing the deflection of heat from the drum chamber B into the lamp compartment the partition 5 that sub-divides the interior of the shell of the stove is made double so that an annular air space exists between the upper and lower plates of the partition. Air is admitted to this air space through perforations 1' in the stove shell. For the purpose of insuring a greater degree of insulation between the drum chamber and lamp compartment the plates of the partition have applied to them interior and exterior annular layers 5' of asbestos or other suitable insulating material.

I claim:

1. In a stove of the character described, the combination of a shell having a horizontal partition, formed with an orifice, and whereby it is sub-divided interiorly into a lamp compartment and a drum chamber and having an outlet opening at its top, and a pair of crossed segment shaped baffle plates mounted in said drum chamber, and arranged obliquely to each other, substantially as set forth.

2. In a stove of the character described, the combination of a shell having a horizontal partition, formed with an orifice, and whereby it is sub-divided interiorly into a lamp compartment and a drum chamber and having an outlet opening at its top, and a pair of crossed segment shaped baffle plates mounted in said drum chamber, and arranged obliquely to each other; said baffle plates being perforated, substantially as set forth.

3. In a stove of the character described, the combination of a shell having a horizontal partition, formed with an orifice, and whereby it is sub-divided interiorly into a lamp compartment and a drum chamber and having an outlet opening at its top, and a pair of crossed segment shaped baffle plates mounted in said drum chamber, and arranged obliquely to each other; said baffle plates being so arranged as to overlap each other, substantially as set forth.

4. In a stove of the character described, the combination of a shell having a horizontal partition, formed with an orifice, and whereby it is sub-divided interiorly into a lamp compartment and a drum chamber and having an outlet opening at its top, and a pair of crossed baffle plates mounted in said drum chamber, and arranged obliquely to each other; said baffle plates being of segmental shape and overlapping each other, substantially as set forth.

5. In a stove of the character described, the combination of a shell having a horizontal partition, formed with an orifice, and whereby it is sub-divided interiorly into a lamp compartment and a drum chamber and having an outlet opening at its top, and a pair of crossed segment shaped baffle plates mounted in said drum chamber, and arranged obliquely to each other; said baffle plates being so arranged as to overlap each other and being provided with perforations, substantially as set forth.

6. In a stove of the character described, the combination of a shell, an apertured horizontal partition in said shell sub-dividing it into a lamp compartment and a drum chamber, and crossed segment shaped baffle members located in said drum chamber, substantially as set forth.

7. In a stove of the character described, the combination of a shell containing a lamp compartment, and a drum chamber, and a double apertured partition providing an annular air space and sub-dividing the interior of the shell into said compartments, substantially as set forth.

8. In a stove of the character described, the combination of a shell containing a lamp compartment and a drum chamber, and a double apertured partition providing an annular air space and sub-dividing the interior of the shell into said compartments; said shell being perforated to permit the entrance of air into the annular air space between the walls of said partition, substantially as set forth.

9. In a stove of the character described, the combination of a shell containing a lamp compartment and a drum chamber a double apertured partition providing an annular space and sub-dividing the interior of the shell into said compartments, and interior and exterior annular layers of insulating material applied to the plates of said partition, substantially as set forth.

In testimony whereof, I have hereunto set my hand at the city of St. Louis, Missouri, this 16th day of May, 1907.

WILLIAM W. PORTMANN.

In the presence of—
LILY ROST,
BLANCHE HOGAN.